(12) United States Patent
Mostowski

(10) Patent No.: US 6,451,140 B1
(45) Date of Patent: Sep. 17, 2002

(54) CHRISTMAS TREE DECORATIONS CONSISTING OF SEVERAL BLOWN GLASS OBJECTS ASSEMBLED TOGETHER

(76) Inventor: Aleksander Mostowski, Street Gronowa 17 B, PL-42-271, Czestochowa (PL)

( * ) Notice: Subject to any disclaimer, the term of this patent is extended or adjusted under 35 U.S.C. 154(b) by 0 days.

(21) Appl. No.: 09/530,737

(22) PCT Filed: Jul. 16, 1998

(86) PCT No.: PCT/PL98/00032

§ 371 (c)(1),
(2), (4) Date: May 4, 2000

(87) PCT Pub. No.: WO99/22628

PCT Pub. Date: May 14, 1999

(30) Foreign Application Priority Data

Nov. 4, 1997 (PL) .................................................. 323011

(51) Int. Cl.$^7$ ........................... A47G 33/08; C03C 27/10
(52) U.S. Cl. ............................. 156/63; 156/293; 428/7; 428/11
(58) Field of Search ......................... 428/7, 11; 156/63, 156/293

(56) References Cited

U.S. PATENT DOCUMENTS

| | | | | |
|---|---|---|---|---|
| 2,353,853 A | * | 7/1944 | Sayford | 428/11 |
| 4,285,746 A | * | 8/1981 | DePuy et al. | 428/11 X |
| 4,491,494 A | * | 1/1985 | Davis, Jr. et al. | 156/86 |
| 4,493,862 A | | 1/1985 | Allbert et al. | |

FOREIGN PATENT DOCUMENTS

| | | |
|---|---|---|
| DE | 3916839 A1 * | 11/1990 |
| FR | 9409838 | 8/1994 |
| PL | 120335 | 10/1983 |

OTHER PUBLICATIONS

Shields, J, Adhesives Handbook, 1970, pp. 39–40.*

* cited by examiner

Primary Examiner—Jeff H. Aftergut
(74) Attorney, Agent, or Firm—Sofer & Haroun, LLP

(57) ABSTRACT

The invention concerns a method for producing Christmas tree decorations consisting of several blown glass objects assembled together consisting in: implanting a seat in the base element body which can freely receive the tenons of the other element. Before they are assembled the seat and the tenon are coated with a quick-setting plastic binder such that the seat-tenon assembly is slightly elastic. The unpolished Christmas tree decoration can therefore be easily subjected to further surface treatment such as being painted, coated with paste or covered with brocade and the like.

5 Claims, No Drawings

CHRISTMAS TREE DECORATIONS CONSISTING OF SEVERAL BLOWN GLASS OBJECTS ASSEMBLED TOGETHER

The subject of the patent is the production of Christmas tree ornaments composed of several blown objects assembled to form one piece.

Several methods related to assembling glass elements are known.

The heat method involves welding elements preheated to the softening temperature, which is a difficult technique requiring a great deal of labor. It requires high qualifications and a considerable amount of work and leads to great consumption of heat energy, and the resulting assembly is rigid, fragile, and breakable.

The glass elements can also be assembled using glues. But doing so requires elements with large surface areas, and the majority of the glues are subject to the aging process, particularly under the influence of weather.

Glass elements can also be assembled using metal structures in the form of frames. This is the method used to produce stained glass windows, and it is suitable practically only for flat elements.

According to the description of Polish patent no. 120335, a method for assembling glass and/or ceramic elements is known that consists of making construction attachments that are coated or dipped in the molten assembly material, since the temperature of the glass and/or ceramic elements is maintained between 50° C. and the fusion temperature of the assembly material in order to have the assembly material solidify subsequently. The attachments of two or more shaped glass and/or ceramic elements are then finally assembled by soldering or welding.

The method in accordance with the invention essentially consists of eliminating the heated operations thanks to execution, at the stage of producing the blown glass objects, in the form of seats having the dimensions and spatial layouts of the defined base bodies of the blown objects on which one freely places the tenons of other elements of appropriate shape, while the seat itself and the tenons, before assembly of the elements, are covered with a quick-setting plastic bonding material.

The method of completing the assemblies consists of making in the base bodies, during the phase of producing the blown glass object, a seat having a profile and a spatial arrangement allowing the tenon for the other elements of the Christmas tree ornament to be freely placed in such a way that it can be placed in accordance with the desired shape and in the appropriate direction, while the surfaces of the assembly seat and tenon are coated with a quick-setting plastic bonding material so they can be assembled afterward and so they can be placed in a mould providing the desired, reproducible shapes of Christmas tree ornaments while the bonding material is setting. Depending on the number of elements assembled in the base body, one or more identical seats can be made in one or more assembled elements, and on other elements there are appropriately formed assembly tenons.

The advantage of the method in accordance with the invention is the possibility of assembling several blown glass objects in a permanent fashion while forming Christmas tree ornaments having varied shapes and dimensions, having flat arrangements with any spacing, since the assembly is done without reheating, and after it solidifies the assembly is permanent but elastic.

The glass Christmas tree ornaments made in that way of several blown glass objects assembled to form one piece can be subjected to other operations to decorate the surface, such as painting, gilding, embellishment, and the like.

What is claimed is:

1. A method for constructing a Christmas tree ornament, said method comprised of the steps of:
    producing a blown glass base element, said blown glass base element having at least one seat formed thereon wherein said seat is of a predetermined size and surface;
    producing at least one additional blown glass element, said additional blown glass element having at least one tenon formed thereon, said tenon having a predetermined size and surface for fitting into said seat formed on said blown glass base element; and
    coating with a quick setting adhesive said tenon and said seat forming said ornament by inserting said adhesive coated tenon into said seat.

2. The method as claimed in claim 1, wherein after said coating step the method further comprises the step of subjecting said ornament to surface treatments including any one of painting, gilding, and embellishment.

3. The method as claimed in claim 1, further comprising the step of forming a plurality of seats on said blown glass base element.

4. The method as claimed in claim 3, further comprising the step of forming a plurality of additional blown glass elements, each of said additional blown glass elements having a tenon formed thereon.

5. The method as claimed in claim 4, further comprising the steps of coating with a quick setting adhesive said plurality of tenons and said plurality of seats forming said ornament by inserting said adhesive coated tenons into said seats.

* * * * *